Feb. 3, 1959  H. M. DAVIS  2,871,577
QUESTION AND ANSWER DEVICE USING MULTIPLE ROTATING DISCS
Filed April 10, 1953  3 Sheets-Sheet 1
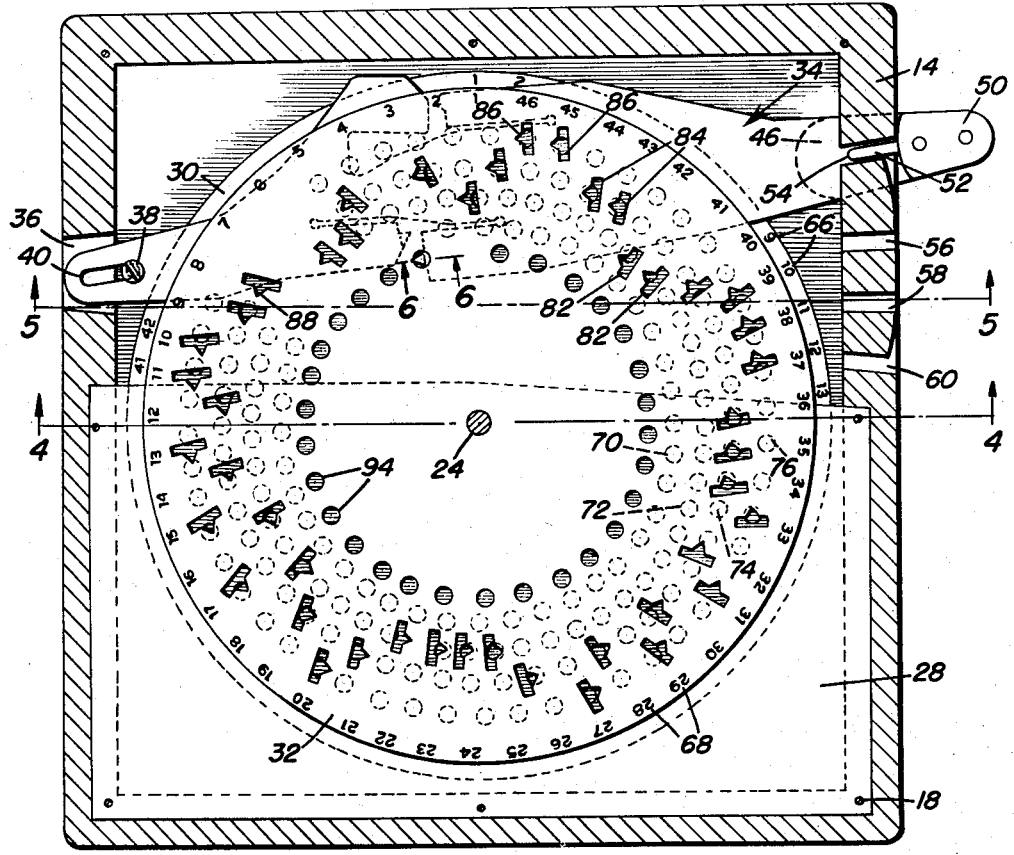
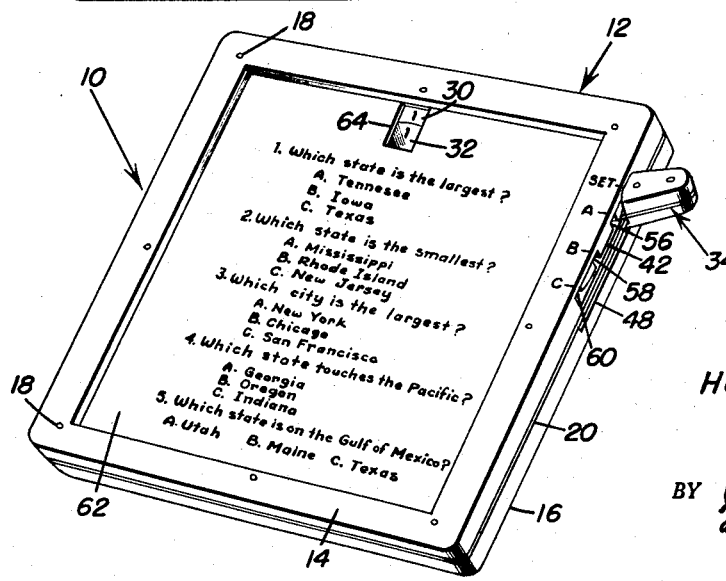
Hollie M. Davis
INVENTOR.

Feb. 3, 1959 H. M. DAVIS 2,871,577
QUESTION AND ANSWER DEVICE USING MULTIPLE ROTATING DISCS
Filed April 10, 1953 3 Sheets-Sheet 2
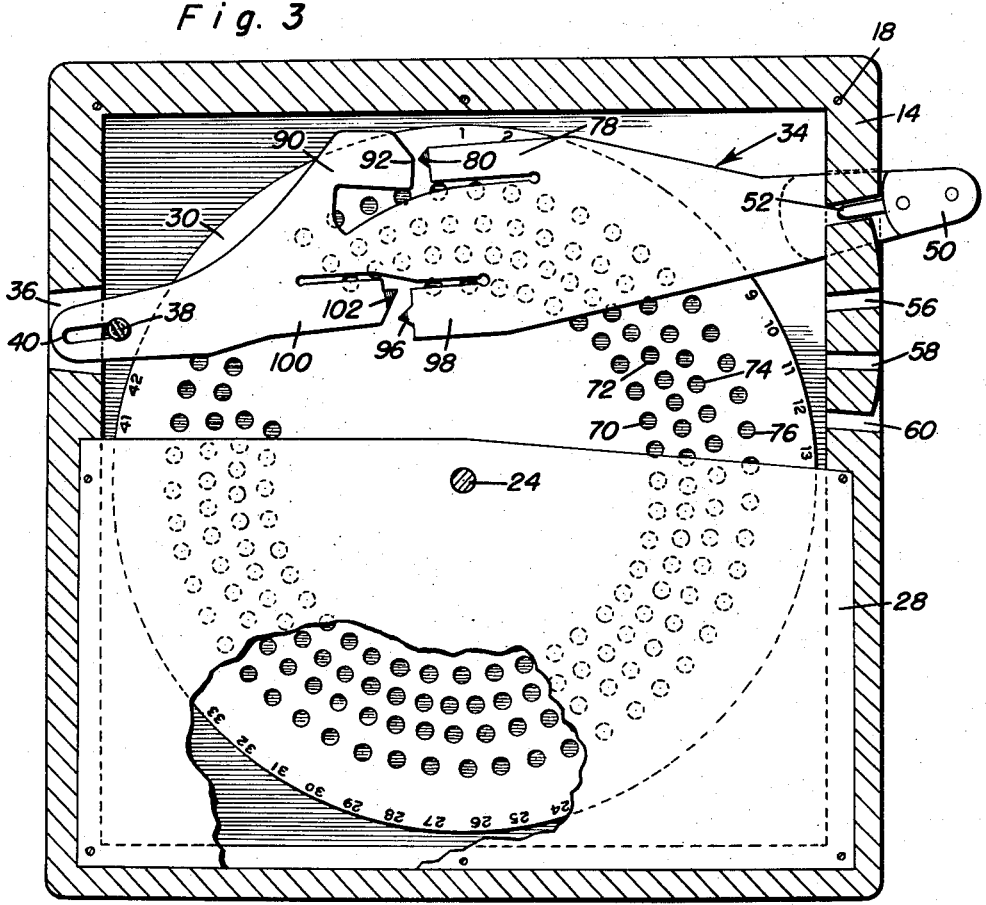
Fig. 3
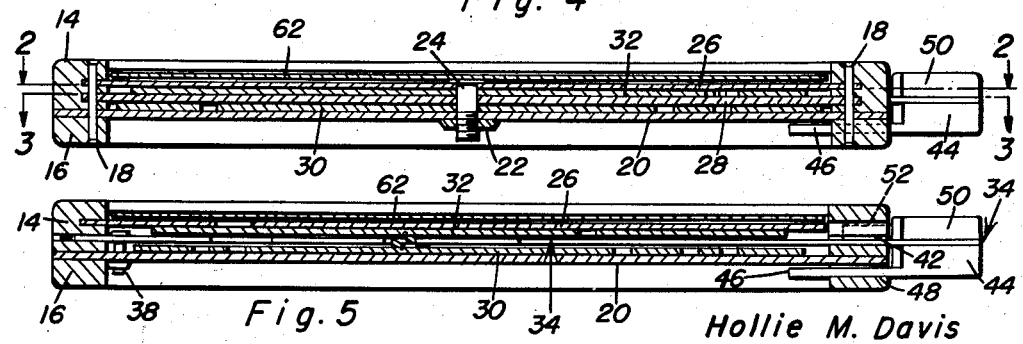
Fig. 4
Fig. 5
Fig. 6
Fig. 7
Hollie M. Davis
INVENTOR.

Feb. 3, 1959  H. M. DAVIS  2,871,577
QUESTION AND ANSWER DEVICE USING MULTIPLE ROTATING DISCS
Filed April 10, 1953  3 Sheets-Sheet 3

Hollie M. Davis
INVENTOR.

BY
Attorneys

United States Patent Office 2,871,577
Patented Feb. 3, 1959

2,871,577

QUESTION AND ANSWER DEVICE USING MULTIPLE ROTATING DISCS

Hollie M. Davis, River Edge, N. J.

Application April 10, 1953, Serial No. 347,962

3 Claims. (Cl. 35—9)

This invention relates to a machine or apparatus especially designed for multiple answer tests and is intended to permit the self-marking of such tests.

A primary object of this invention is to provide an improved teaching machine which may be utilized in combination with multiple answer tests for the mechanical scoring of such tests, said machine being operable by one taking the test and being so designed to indicate both the number of questions answered and the number of correct answers.

Another object of this invention is to provide an improved teaching machine which includes a supporting frame having imprinted on the walls thereof questions and answers to be utilized in combination with the machine, said machine being so designed whereby a user of the same cannot predetermine the correct answer other than by the knowledge of the answer to the question.

Another object of this invention is to provide an improved teaching machine which is of an extremely simple construction and which is formed of readily obtainable material whereby the same is economically feasible.

A further object of this invention is to provide an improved teaching machine which is of a relatively simple and compact construction and which is light in weight whereby the same may be conveniently handled.

A still further object of this invention is to provide an improved teaching machine which includes a question and answer disk for indicating the number of the question to be answered and a counting disk for indicating the number of attempts made, said disks being operated by a lever selectively positionable to indicate the answer of the number of the question to be answered as indicated by the teaching machine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top perspective view of the teaching machine which is the subject of this invention and which shows the general outline of the same;

Figure 2 is a longitudinal sectional view taken substantially upon the plane indicated by the section line 2—2 through the machine, as illustrated in Figure 4, and shows the relationship of the question and answer disk with respect to the lever and the counting disk;

Figure 3 is a sectional view similar to Figure 2 taken substantially upon the plane indicated by the section line 3—3 of Figure 4 and shows the relationship of the actuating lever with respect to the counting disk, a portion of a partition wall being broken away in order to clearly illustrate the construction of the counting disk;

Figure 4 is a transverse sectional view taken substantially upon the plane indicated by the section line 4—4 of Figure 2 and shows the general cross section of the teaching machine;

Figure 5 is a transverse sectional view similar to Figure 4 and is taken substantially upon the plane indicated by the section line 5—5 of Figure 2;

Figure 6 is an enlarged fragmentary transverse sectional view taken substantially upon the plane indicated by the section line 6—6 of Figure 2 and shows the relationship between a cooperating finger on the actuation lever and an associated opening in the question and answer disk;

Figure 7 is an enlarged fragmentary sectional view similar to Figure 6 and shows the relationship of another finger of the actuating lever and another cooperating opening in the question and answer disk;

Figure 8:
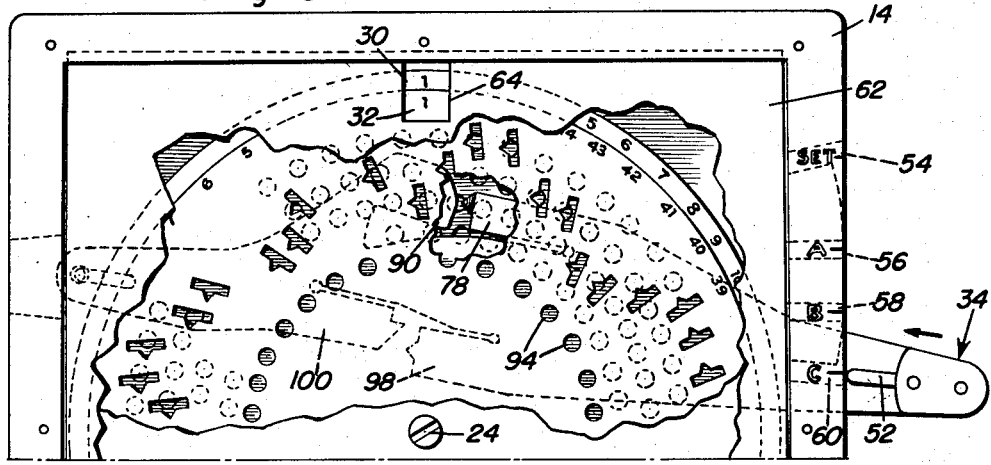
Figure 8 is a fragmentary elevational view of the teaching machine with various portions thereof broken away and shows the relationship of the two disks and the lever applied in the answering of a first question of a test, the lever being positioned adjacent the answer choice for the particular question.
Figure 9:
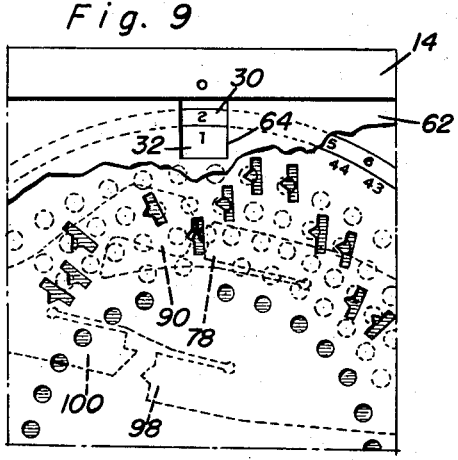
Figure 9 is a fragmentary front elevational view showing the upper central portion of the teaching machine after the actuating lever has been moved inwardly from the position illustrated in Figure 8 to actuate the counting disk.
Figure 10:
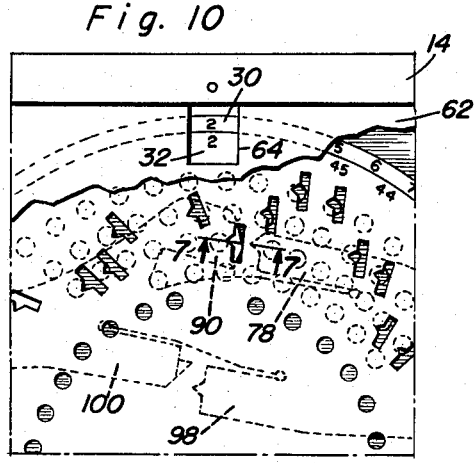
Figure 10 is a view somewhat similar to Figure 9 and shows the relationship of the disk and the actuating lever after the same has been moved outwardly with the question and answer disk being moved to indicate that the actuating lever was properly positioned to indicate the correct answer for the question being answered.
Figure 11:
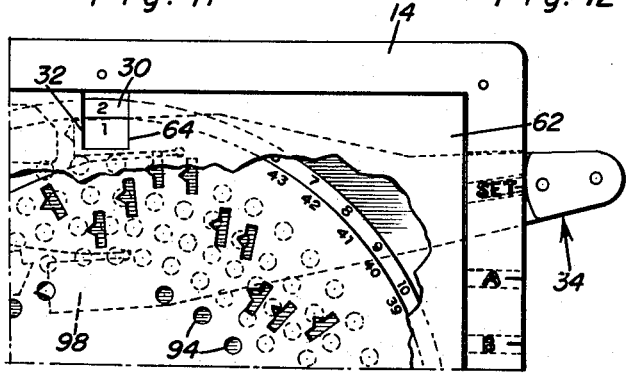
Figure 12:
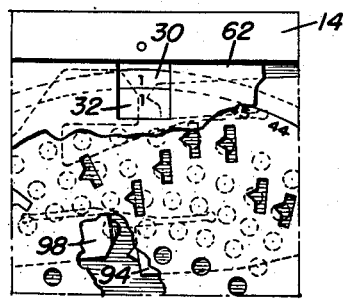

Figure 11 is a fragmentary elevational view somewhat similar to Figure 8 and shows the teaching machine after the actuating lever has been moved outwardly to a reset position and moved inwardly to return the question and answer disk to its initial position; and Figure 12 is a fragmentary elevational view somewhat similar to Figure 10 and shows the teaching machine after the actuating lever has been moved outwardly to reset the counting disk.

Referring now to the drawings in detail it is seen that there is best illustrated in Figure 1 the teaching machine which is the subject of this invention, the teaching machine being referred to in general by the reference numeral 10. The teaching machine 10 includes a rectangular frame which is referred to in general by the reference numeral 12. The frame 12 includes a front rectangular frame half 14 and a rear rectangular frame half 16, the frame halves 14 and 16 being secured together by spaced fasteners 18 with a rear wall 20 disposed therebetween.

Referring now to Figure 4 in particular, it will be seen that the rear wall 20 has carried by the rear surface thereof a centrally located boss 22 which is internally threaded. Passing through the rear wall 20 and threadedly engaged in the boss 22 is a forwardly extending fastener 24. The forward portions of the fastener 24 are supported by transversely spaced forward and rear spacers 26 and 28, respectively. The spacers 26 and 28 extend only slightly above the mid-point of the teaching machine, as is best illustrated in Figure 3, and are retained within the forward frame half 14 by the fasteners 18.

Carried by the fastener 24 between the rear spacer 28 and the rear wall 20 is a circular disk which may be referred to as the counting disk 30. The disk 30 is rotatably mounted on the fastener 24 for actuation in a manner to be described in more detail hereinafter and indicates the number of answers given plus one. It will be understood that the counting disk 30 is frictionally engaged with both the rear wall 20 and the rear spacer 28 so as to remain in the last moved to position.

Disposed between the forward spacer 26 and the rear spacer 28 is a second disk which is referred to as the question and answering disk 32. The disk 32, like the disk 30, is rotatably mounted on the fastener 24, and is frictionally retained in a selected position.

Extending between and disposed in the slots in the side frame members of the forward frame half is an actuating lever which is referred to in general by the reference numeral 34. The actuating lever 34 has one end thereof disposed in a slot 36 formed in the forward frame half 14 and is slidably retained therein by a fastener 38 carried by the rear wall 20 in the manner best illustrated in Figure 5. The fastener 38 is disposed in an elongated slot 40 in the actuating lever to facilitate movement thereof longitudinally of its length.

The other end of the actuating lever 34 passes through an elongated slot 42 in the opposite side frame member of the forward frame half 14 to facilitate pivoting about the fastener 38. Secured to the rear face of the opposite end of the actuating lever 34 is a first handle portion 44 which has a narrow extension 46 projecting through an elongated slot 48 in the rear frame half 16 to form a guide for the actuating lever 34.

Secured to the forward face of the other end of the actuating lever 34 is a front handle forming portion 50 which has integral therewith an inwardly extending pin 52. The pin is selectively positioned in a plurality of spaced recesses in the side frame member of the forward frame half in which the elongated slot 42 is formed. It will be understood that the recesses communicate with the slot 42 for ease of construction.

The recesses adapted to receive the pin 52 include an uppermost recess 54 which is indicated by the word "Set" formed on the front face of the forward frame half 14, as is best illustrated in Figure 1. The next lower recess is referred to by the reference numeral 56 and is identified by the letter A. The next lower recess is indicated by the reference numeral 58 and referred to by the letter B. The lowermost recess 60 is referred to by the letter C. The letters A, B, and C are also imprinted on the forward face of the forward frame half 14 in vertical alignment with the word "Set."

Referring now to Figures 1 and 4 in particular, it will be seen that carried by the forward frame half 14 and overlying the forward spacer 26 is a front wall 62. The front wall 62 may have imprinted thereon suitable questions with a multiplicity of answers with each question being referred to in sequence by number, as is best illustrated in Figure 1. It will be noted that the upper central portion of the front wall 62 is provided with a window 64 through which may be viewed uppermost portions of the disks 30 and 32.

Referring now to Figure 2 in particular, it will be seen that the disk 30 is of a greater diameter than the disk 32 whereby the peripheral portion thereof may be visible through the window 64, as is best illustrated in Figure 1. Carried by the peripheral portion of the disk 30 on the front surface thereof are spaced numerals 66 in sequence arranged in a clockwise direction, and indicating the number of answers given. The peripheral portion of the disk 32 is also provided with circumferentially spaced numerals in sequence increasing in a counterclockwise direction, the numerals being referred to by the reference numeral 68 and indicating both the number of questions which have been correctly answered, less one, and the number of the question to be answered.

Referring now to Figure 3 in particular, it will be seen that the disk 30 is provided with four concentric rows of circumferentially spaced apertures, the rows being referred to from the center outwardly by the reference numerals 70, 72, 74 and 76, respectively. Carried by the upper right hand portion of the actuating lever 34 is an inwardly directed finger 78 which has a rearwardly directed tab 80 at its inner end. The tab 80 is so positioned relative to the rows of openings 72, 74 and 76 that when the pin 52 is disposed adjacent one of the recesses 56, 58 or 60, the tab 80 will engage one of the openings of the rows 76, 74 and 72, respectively. Inward movement of the actuating lever 34 from a position similar to that illustrated in Figure 8 will result in rotation of the disk 30 in a counterclockwise direction a distance sufficient to move the next numeral 66 into the window 64 to indicate that an attempt to answer a question has been made.

Referring now to Figure 2 in particular, it will be seen that the disk 32 is provided with concentric rows of generally rectangular openings, the rows being referred to from the innermost row outwardly by the reference numerals 82, 84 and 86. It will be noted that the rows of openings 82, 84 and 86 overlie the rows of openings 72, 74 and 76, respectively, of the disk 30. It will also be noted that each of the openings of the rows 82, 84 and 86 is provided with a counterclockwise extending triangular extension 88.

Carried by the left central portion of the actuating lever 34 in substantial alignment with the finger 78 is an inwardly directed finger 90 which opposes the finger 78. The finger 90 includes an angular free end 92 which is adapted to engage in one of the rows of openings 82, 84 and 86 and when the actuating lever 34 is moved to the right, as viewed in the drawings, the disk 32 will be moved in a clockwise direction to indicate that a correct answer has been given.

Referring to Figure 1 once again, it will be seen that each of the questions is provided with three possible answers which are indicated by the letters A, B and C which correspond to the designations of the recesses 56, 58 and 60, respectively. In the utilization of the teaching device 10 the supposedly correct answer is picked and indicated by moving the pin 52 in the associated recess. Inward movement of the pin 52 is accomplished by inward movement of the actuating lever 34 which results in the advancing of the disk 30 one numeral, as set forth above. Should the indicated answer be correct there will be positioned in alignment with the finger 90 for engagement thereby one of the openings of the rows of openings 82, 84 and 86. Movement of the finger 90 to the right will result in the advancing of the disk 32 one numeral to indicate one correct answer for one question answered and to indicate that the next question is now to be answered. However, should the indicated answer be incorrect the disk 32 will not have an opening for receiving the inner end of the finger 90 whereby the finger 90 will move to the right without actuating the disk 32. At this time the numeral of the disk 32 viewed through the window 64 will be one less than the numeral 66 of the disk 30 viewed through the window so as to indicate one error. The student then again answers the same question selecting another answer. Should this second answer be correct then both of the disks 30 and 32 will rotate. The question is repeatedly answered until answered correctly. It will be understood that this is repeated until the particular exercise is completed at which time the total number of errors may be readily ascertained by subtracting the reading of disk 32 from the reading of disk 30.

After the exercise has been concluded it is desirable to reset the disks 30 and 32. This is accomplished by aligning the pin 52 with the recess 54 indicated by the word "Set." The handle portion of the actuating lever 34 is then moved inwardly. In order that the disk 32 may be returned to its starting position it is provided with an innermost row of circular openings 94. The openings 94 are selectively engageable by a tab 96 formed on the inner end of an inwardly extending finger 98, the finger 98 being disposed vertically below the finger 78.

The actuating lever 34 includes a fourth finger 100 which is in opposed alignment with the finger 98. The finger 100 includes a tab 102 at its free end which is rearwardly directed. The tab 102 when the pin 52 is in the recess 54 is aligned with the innermost row of openings 70 and when the actuating lever 34 is moved to the right the disk 30 is moved toward its initial position. It will be understood that the rows of openings 70 and 94 are interrupted whereby when the disks 30 and 32 are returned to their initial positions additional reciprocation of the pin 52 in the recess 54 will not result in further movement of the disks 30 and 32.

It will be understood that the front wall 62 completely covers the disk 32 and that the rear wall 20 covers the disk 30 whereby a person utilizing the teaching machine 10 may not ascertain in advance the correct answer to a question. In this manner students and others may be given tests utilizing the teaching machine without the possibility of the student predetermining the answer to a question without actual knowledge of the same. Inasmuch as the teaching machine automatically indicates an error, a person utilizing the same may readily ascertain the mistake at the time of its making so that it will be impressed on them and the mistake will not be repeated at a later date.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A teaching machine for use with multiple answer question sheets, said machine comprising a supporting frame including a rear wall, a shaft secured to said rear wall and extending through said frame generally normal to said rear wall, a first disk rotatably journaled on said shaft in overlying relation to said rear wall, a second disk rotatably journaled on said shaft in overlying relation to said first disk, a spacer disposed intermediate said first and second disks and retaining said disks in spaced relation, said second disk being of a smaller size than said first disk whereby a peripheral portion of said first disk is exposed below said second disk, said frame including a front wall overlying said second disk, a window in said front wall, said window being aligned with said first disk peripheral portion and a peripheral portion of said second disk, numerical indicia on said first disk peripheral portion visible through said window indicating the total number of answers given, other numerical indicia on said second disk peripheral portion visible through said window indicating the number of the question to be answered, a lever disposed generally within the plane of said frame and extending transversely of said frame intermediate said first disk and said second disk, connecting means between an edge portion of said frame and one end of said lever mounting said lever for pivotal and sliding movement generally longitudinally of said lever, the other end of said lever projecting beyond said frame and serving as a handle for actuating and positioning said lever, means on said frame cooperating with said lever for indicating an answer to a question by positioning said lever with respect to said frame, a first finger on said lever facing towards said lever at one end and projecting into engagement with said first disk, said first disk having a series of circumferentially spaced openings with one of said openings being aligned with said first finger at all times whereby when said lever is moved to the answer indicating position said first disk is rotated to advance said first mentioned numerical indicia one number in said window to indicate that an answer has been given, a second finger on said lever facing in an opposite direction from said first finger and projecting into engagement with said second disk, said second disk having a plurality of circumferentially spaced, radially staggered openings corresponding to the position of said second finger when said lever is in a correct answer indicating position whereby when said lever is moved out of a correct answer indicating position preparatory to indicating a next answer said second disk is rotated to advance said other numerical indicia one number in said window to indicate that a next question is to be answered.

2. The teaching machine of claim 1 wherein said second disk is provided with a plurality of circumferentially spaced other openings and said lever is provided with a third finger facing in the same direction as said first finger and projecting into engagement with said second disk for resetting said second disk to an initial position.

3. The teaching machine of claim 1 wherein said second disk is provided with a plurality of circumferentially spaced other openings and said lever is provided with a third finger facing in the same direction as said first finger and projecting into engagement with said second disk for resetting said second disk to an initial position, said third finger being spaced radially from said first finger a distance in excess of the radial extent of said series of circumferentially spaced openings whereby when said third finger is aligned with said other openings said first finger is out of alignment with said series of circumferentially spaced openings and said second disk may be reset independently of said first disk.

References Cited in the file of this patent

UNITED STATES PATENTS

| | | |
|---|---|---|
| 1,670,480 | Pressey | May 22, 1928 |
| 2,311,055 | Kopas | Feb. 16, 1943 |
| 2,496,767 | Zuercher | Feb. 7, 1950 |